United States Patent
O'Regan et al.

(10) Patent No.: US 10,313,317 B2
(45) Date of Patent: Jun. 4, 2019

(54) SYSTEMS AND METHODS FOR SECURELY MANAGING BIOMETRIC DATA

(71) Applicant: Visa International Service Association, San Francisco, CA (US)

(72) Inventors: Alan Joseph O'Regan, Cape Town (ZA); Horatio Huxham, Cape Town (ZA)

(73) Assignee: Visa International Service Association, San Francisco, CA (US)

( * ) Notice: Subject to any disclaimer, the term of this patent is extended or adjusted under 35 U.S.C. 154(b) by 41 days.

(21) Appl. No.: 15/532,004

(22) PCT Filed: Feb. 10, 2016

(86) PCT No.: PCT/IB2016/050696
§ 371 (c)(1),
(2) Date: May 31, 2017

(87) PCT Pub. No.: WO2016/128906
PCT Pub. Date: Aug. 18, 2016

(65) Prior Publication Data
US 2017/0264599 A1    Sep. 14, 2017

(30) Foreign Application Priority Data
Feb. 11, 2015 (ZA) .................................. 2015/00962

(51) Int. Cl.
*H04L 29/06* (2006.01)
*H04L 9/08* (2006.01)
(Continued)

(52) U.S. Cl.
CPC .............. *H04L 63/06* (2013.01); *G06F 21/32* (2013.01); *H04L 9/0866* (2013.01);
(Continued)

(58) Field of Classification Search
CPC . H04L 63/06; H04L 63/0861; H04L 63/0428; G06F 21/32
(Continued)

(56) References Cited

U.S. PATENT DOCUMENTS

2006/0123241 A1*  6/2006  Martinian ............. H04L 9/0866
                                                                713/186
2008/0072063 A1   3/2008  Takahashi et al.
(Continued)

OTHER PUBLICATIONS

International Search Report, dated May 19, 2016, in PCT Application No. PCT/IB2016/050696, 14 pages.
(Continued)

*Primary Examiner* — Evans Desrosiers
(74) *Attorney, Agent, or Firm* — Kilpatrick Townsend & Stock

(57) ABSTRACT

Systems and methods for securely managing biometric data are provided. In a method conducted at a secure element which is directly connected to a biometric input, biometric data is received directly from the biometric input. A biometric signature based on the biometric data is obtained. A seed value specific to the biometric data is accessed by obtaining the seed value from the biometric data or biometric signature. The biometric signature is encoded using an obscured algorithm and the seed value to generate a token which is output for secure storage within the secure element or secure transmission to a secure server for registration or authentication of the biometric data. Obtaining the seed value from the biometric data or biometric signature can be repeated reliably to obtain the same the seed value

19 Claims, 7 Drawing Sheets

(51) Int. Cl.
  *H04L 9/32*   (2006.01)
  *G06F 21/32*  (2013.01)
  *H04W 12/06*  (2009.01)

(52) U.S. Cl.
  CPC ........ *H04L 9/3231* (2013.01); *H04L 63/0428* (2013.01); *H04L 63/083* (2013.01); *H04L 63/0807* (2013.01); *H04L 63/0861* (2013.01); *H04W 12/06* (2013.01)

(58) Field of Classification Search
  USPC ............................................................ 726/6
  See application file for complete search history.

(56) References Cited

U.S. PATENT DOCUMENTS

2011/0047377 A1   2/2011   Allen et al.
2012/0066507 A1   3/2012   Jobmann
2013/0173926 A1*  7/2013   Morese ................... G06F 19/10
                                                  713/186
2015/0026479 A1   1/2015   Yi et al.

OTHER PUBLICATIONS

Meenakshi et al. "Securing Iris Templates using Combined User and Soft Biometric based Password Hardened Fuzzy Vault," Feb. 2, 2010, XP055239779, http://arxiv.org/ftp/arxiv/papers/1003/1003.1449.pdf, retrieved Jan. 8, 2016.

Tulyakov et al. "Symmetric hash functions for secure fingerprint biometric systems," Pattern Recognition Letters, Elsevier, Amsterdam, NL, vol. 28, No. 16, Oct. 11, 2007, pp. 2427-2436, XP022293695.

Ratha et al. "Enhancing security and privacy in biometrics-based authentication systems," IBM Systems Journal, vol. 40, No. 3, Jan. 1, 2001, pp. 614-634, XP008144208.

Supplementary European Search Report, dated Aug. 30, 2018, in EP Application No. 16748809.7, 11 pages.

* cited by examiner

SYSTEMS AND METHODS FOR SECURELY MANAGING BIOMETRIC DATA

CROSS REFERENCE TO RELATED APPLICATION

This application is a National Stage of International Application No. PCT/IB2016/050696 filed Feb. 10, 2016, and which claims the benefit of from South African provisional patent application number 2015/00962 filed on 11 Feb. 2015, of which are all herein incorporated by reference.

FIELD OF THE INVENTION

This invention relates to systems and methods for securely managing biometric data.

BACKGROUND TO THE INVENTION

The use of biometric information for authentication purposes is increasing. Biometric readers, such as fingerprint readers, have been used for some time in authorizing a user's access to facilities or resources. More recently, some mobile phones are being provided with biometric readers for restricting access to certain, preregistered users.

Biometric authentication provides advantages in that it can be easier for users to provide biometric information in order to be authenticated than, for example, entering a user name and password.

However, unlike a username and password, biometric information cannot be changed and, once compromised, should not be reused. This may limit the application of biometric authentication severely as, for example, once a user's fingerprint registered with a biometric authentication service has been leaked to a fraudster, the registration of the fingerprint should be revoked and the compromised fingerprint should not be used for further authentication purposes.

This shortcoming of biometric authentication may be exacerbated by existing systems and methods which inadequately protect biometric information in biometric registration and biometric challenge stages.

There is accordingly a need for a biometric authentication system which addresses these and/or other problems, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a method for securely managing biometric data, the method being conducted at a secure element which is directly connected to a biometric input and comprising: receiving biometric data directly from the biometric input; obtaining a biometric signature based on the biometric data; accessing a seed value specific to the biometric data by obtaining the seed value from the biometric data or biometric signature; encoding the biometric signature using an obscured algorithm and the seed value to generate a token; and outputting the token for secure storage within the secure element or secure transmission to a secure server for registration or authentication of the biometric data.

A further feature may provide for the method to include erasing the biometric data and biometric signature once the token has been output.

A yet further may feature provide for obtaining the seed value from the biometric data or biometric signature to be capable of being repeated reliably to obtain the same the seed value.

Obtaining the seed value may include one of: evaluating predetermined data points of the biometric data or biometric signature to generate a seed value; or applying a predetermined transform to the biometric data or biometric signature to generate a seed value. Evaluating predetermined data points may include applying a masking function to the biometric data or biometric signature. The predetermined data points evaluated or the predetermined transformation applied can be varied to vary the seed value.

A further feature may provide for the seed value to be a variable input to the obscured algorithm which may be varied to vary the algorithm.

Encoding the biometric signature using an obscured algorithm and the seed value may include one of the group of: using the seed value as a separate input to the obscured algorithm; concatenating the seed value together with the biometric signature as a single input to the obscured algorithm; or, selecting an obscured algorithm based on the seed value and encoding the biometric signature using the selected algorithm.

Further features may provide for the obscured algorithm to be an encryption algorithm and for the seed value to be used as an encryption key.

Yet further features may provide for the method to include transmitting the token to a secure server via a secure communication channel for registration or authentication thereat. Transmitting the token to the secure server may include transmitting one or both of the seed value and auxiliary information together with the token.

Still further features may provide for the method to include receiving, from the secure server, an authentication confirmation or denial message.

Even further features may provide for the method to include: receiving, from a secure server, a token for use in authenticating a user; comparing the output token to the stored token; and, if the output token substantially matches the stored token, authenticating the biometric data.

A further feature may provide for the method to include: securely storing the token within the secure element for use in authenticating biometric data locally; comparing a subsequently output token to the stored token; and, if the output token substantially matches the stored token, authenticating the biometric data.

A yet further feature may provide for the auxiliary information to include one or both of: identifying information of the biometric input and identifying information of a user associated with the biometric data.

Still further features may provide for the method to include establishing a secure communication channel with a secure server including: obtaining a random encryption key; encrypting the token using the random encryption key to generate encrypted data; encrypting the random encryption key using a public key of the secure server; and transmitting the encrypted data and encrypted key to the secure server. The secure communication channel may utilise an interaction identifier.

The invention extends to a method for securely managing biometric data, the method conducted at a secure server and comprising: receiving a token from a secure element directly connected to a biometric input, wherein the token is generated at the secure element by obtaining biometric data and encoding a biometric signature using an obscured algorithm and a seed value, wherein the seed value is obtained from the biometric data or biometric signature; and, if the token is received together with a registration request, storing the received token in a database; or, if the token is received together with an authentication request, authenticating the received token.

Receiving the token may include receiving one or both of a seed value and auxiliary information together with the token.

Further features may provide for the token to be received together with auxiliary information and a seed value, and for authenticating the received token to include: identifying a stored token and stored seed value associated with the received auxiliary information; decoding the received token and the stored token using the obscured algorithm and the received seed value to obtain a biometric signature; comparing the obtained biometric signatures; and, if the biometric signatures substantially match, transmitting an authentication confirmation to the secure element.

Still further features may provide for the token to be received together with auxiliary information, and for authenticating the received token to include: identifying a stored token associated with the received auxiliary information; comparing the stored token with the received token; and, if the stored token substantially matches the received token, transmitting an authentication confirmation to the secure element.

Yet further features may provide for the method to include retrieving a stored token from the database and transmitting the retrieved token to a secure element for use in authenticating a user thereat.

The token may be received from the secure element via a secure communication channel, including: receiving encrypted data and an encrypted key; decrypting the encrypted key using a private key of the secure server; and using the decrypted key to decrypt the encrypted data and obtain the token.

The invention extends to a system for securely managing biometric data, the system including a secure element, which is directly connected to a biometric input, comprising: a biometric data receiving component for receiving biometric data directly from the biometric input; a biometric signature obtaining component for obtaining a biometric signature based on the biometric data; a seed value accessing component for accessing a seed value specific to the biometric data by obtaining the seed value from the biometric data or biometric signature; an encoding component for encoding the biometric signature using an obscured algorithm and the seed value to generate a token; and an output component for outputting the token for secure storage within the secure element or secure transmission to a secure server for registration or authentication of the biometric data.

The secure element may include a flushing component for flushing the biometric data and biometric signature once the token has been output.

A further feature may provide for the seed value accessing component to be arranged to reliably obtain the same seed value from the biometric data or biometric signature.

Still further features may provide for the seed value accessing component to include one or both of: an evaluating component for evaluating predetermined data points of the biometric data or biometric signature to generate a seed value; and a transform component for applying a predetermined transform to the biometric data or biometric signature to generate a seed value.

The evaluating component may apply a masking function to the biometric data or biometric signature.

Yet further features may provide for the seed value accessing component to be arranged to vary the predetermined data points evaluated or the predetermined transformation applied so as to vary the seed value.

The seed value may be a variable input to the obscured algorithm which may be varied to vary the algorithm.

Further features may provide for the encoding component to be arranged to: use the seed value as a separate input to the obscured algorithm; or concatenate the seed value together with the biometric signature as a single input to the obscured algorithm; or select an obscured algorithm based on the seed value and encode the biometric signature using the selected algorithm.

Still further features may provide for the obscured algorithm to be an encryption algorithm and for the seed value to be used as an encryption key.

Yet further features may provide for the secure element to include a communication component for transmitting the token to a secure server via a secure communication channel for registration or authentication thereat.

An even further feature may provide for the communication component to transmit one or both of the seed value and auxiliary information together with the token.

A further feature may provide for the communication component to receive, from the secure server, an authentication confirmation or denial message.

A yet further feature may provide for the secure element to include: a communication component for receiving, from a secure server, a token for use in authenticating a user; and an authentication component for comparing the output token to the stored token and for, if the output token substantially matches the stored token, authenticating the biometric data.

A still further feature may provide for the secure element to include: a storing component for securely storing the token within the secure element for use in authenticating biometric data locally; and an authentication component for comparing a subsequently output token to the stored token and for, if the output token substantially matches the stored token, authenticating the biometric data.

The invention extends to a system for securely managing biometric data, the system including a secure server comprising: a communication component for receiving a token from a secure element directly connected to a biometric input, wherein the token is generated at the secure element by obtaining biometric data and encoding a biometric signature using an obscured algorithm and a seed value, wherein the seed value is obtained from the biometric data or biometric signature; and, a storing component for, if the token is received together with a registration request, storing the received token in a database; or, an authentication component for, if the token is received together with an authentication request, authenticating the received token.

Further features may provide for the communication component to receive the token together with auxiliary information and a seed value, and for the authenticating component to include: a database searching component for identifying a stored token and stored seed value associated with the received auxiliary information; a decoding component for decoding the received token and the stored token using the obscured algorithm and the received seed value to obtain a biometric signature; and a comparison component for comparing the obtained biometric signatures, and, if the biometric signatures substantially match, for the communication component to transmit an authentication confirmation to the secure element.

Still further features may provide for the communication component to receive the token together with auxiliary information, and for the authenticating component to include: a database searching component for identifying a stored token associated with the received auxiliary information; and a comparison component for comparing the stored token with the received token, and, if the stored token substantially matches the received token, for the communication component to transmit an authentication confirmation to the secure element.

Yet further features may provide for the secure server to include a database searching component for retrieving a stored token from the database, and for the communication component to transmit the retrieved token to a secure element for use in authenticating a user thereat.

The invention extends to a computer program product for securely managing biometric data, the computer program product comprising a computer-readable medium having stored computer-readable program code for performing the steps of: receiving biometric data directly from the biometric input; obtaining a biometric signature based on the biometric data; accessing a seed value specific to the biometric data by obtaining the seed value from the biometric data or biometric signature; encoding the biometric signature using an obscured algorithm and the seed value to generate a token; and outputting the token for secure storage within the secure element or secure transmission to a secure server for registration or authentication of the biometric data.

The invention extends to a computer program product for securely managing biometric data, the computer program product comprising a computer-readable medium having stored computer-readable program code for performing the steps of: receiving a token from a secure element directly connected to a biometric input, wherein the token is generated at the secure element by obtaining biometric data and encoding a biometric signature using an obscured algorithm and a seed value, wherein the seed value is obtained from the biometric data or biometric signature; and, if the token is received together with a registration request, storing the received token in a database; or, if the token is received together with an authentication request, authenticating the received token.

Further features may provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Figure 1:
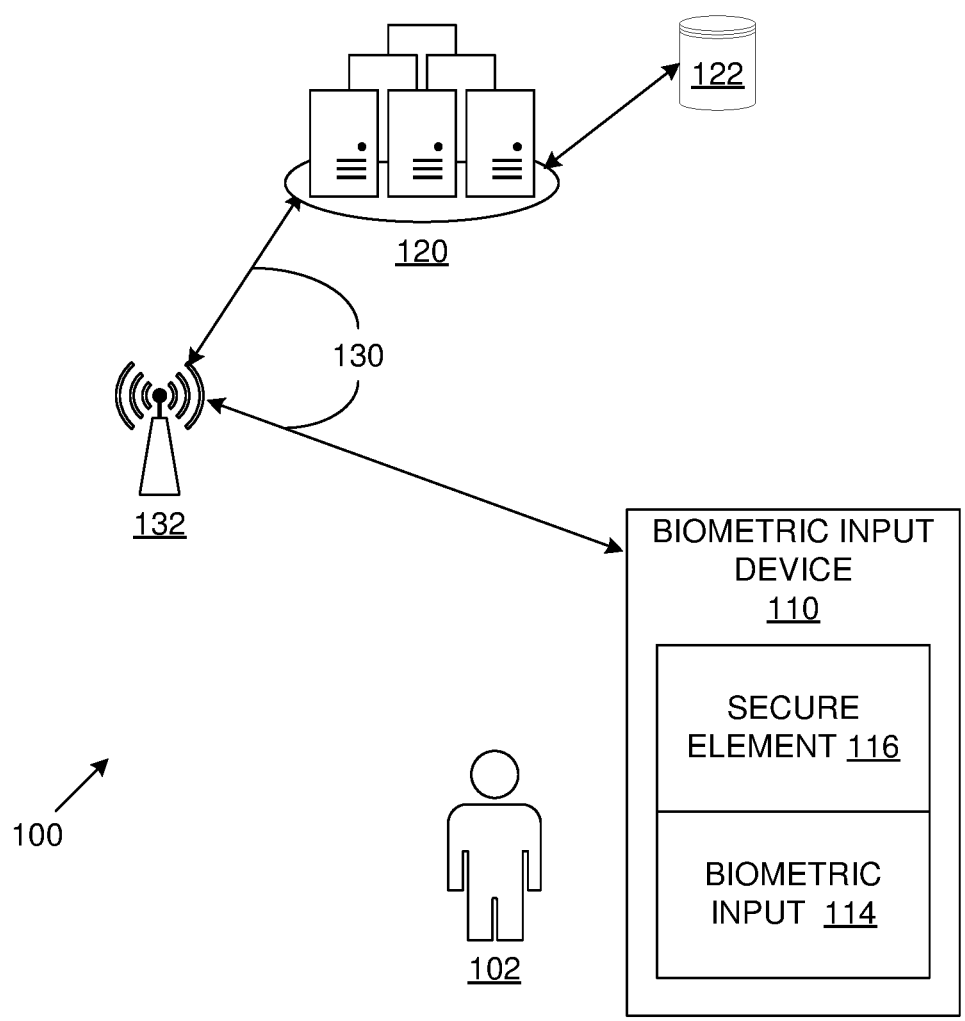
FIG. 1 is a schematic diagram which illustrates an exemplary system for securely managing biometric data.

FIG. 1 is a schematic diagram which illustrates an exemplary system (100) for securely managing biometric data.

The system (100) includes a biometric input device (110), having a biometric input (114) directly connected to a secure element (116), and a secure server (120). The biometric input device (110) may be a registration device for registering users with the system (100) or a challenge device for authenticating a user. In some embodiments, a single device may serve as a registration device and a challenge device. Although only one device (110) is illustrated, it should be appreciated that there may be a plurality of registration and authentication devices.

The biometric input device (110) may be configured to obtain any appropriate form of a user's biometric data. Exemplary biometric data includes fingerprint, thumb print or palm records, iris or retina records, facial recognition records, DNA records, voice records, gait records and like. The biometric data may be any appropriate data representations (e.g. images, sequences, videos, audio recordings, etc.) of the user's biometrics from which unique features, characteristics and/or patterns can be extracted.

The biometric input device (110) may be a purpose-built device. In some embodiments, the biometric input device (110) may be a suitably configured mobile communication device, such as a mobile phone, having a biometric input which is directly connected to a secure element.

The secure element (116) of the biometric input device (110) is configured to obtain a biometric signature based biometric data received at the biometric input. The secure element (116) of the device (110) may extract features (such as patterns or minutiae in, for example, the case of fingerprints) of the biometric data based on a suitable algorithm and generate the biometric signature. In some embodiments, the biometric signature may be a vector of numbers or an image with certain properties. The biometric signature may be a synthesis of relevant characteristics extracted from the biometric data. The biometric signature may include information relating to patterns, characteristics and/or minutiae which can be reliably found in biometric data and which can be used to uniquely identify the biometric data, and in turn an associated user (102). Elements of the biometric data that are not used in the comparison algorithm may be discarded in the biometric signature.

The secure element (116) of the device (110) is further configured to access a seed value specific to the biometric signature and to encode the biometric signature using an algorithm, which is obscured or hidden within the secure element, and the seed value to generate a token. This token is in effect a secure seeded biometric which can be cancelled, changed or revoked should it be compromised.

The seed value is specific to the biometric signature and may be varied or changed so as to vary the algorithm and/or the token, such that no two biometric signatures have the same seed value. The seed value may also be specific to a particular instance of biometric data. Embodiments anticipate the same biometric signature having two corresponding tokens each of which having been registered at a different time and each token having a unique seed value. Thus different systems may use different seed values to generate different tokens which can then be used within their respective systems for authentication and authorization. Should one of the tokens be compromised, it can be revoked or cancelled without affecting use of other tokens, corresponding to the same biometric signature, in other systems.

In one embodiment, the seed value is obtained from the biometric data. For example, the biometric data may be a fingerprint and obtaining the seed value from the fingerprint may evaluate designated coordinates of the fingerprints and assign either a 1 or 0 depending on whether there is a line there. Therefore when this is performed at registration—i.e. where the specified series of points or coordinates are evaluated, a seed value to be used can be identified.

Subsequently, at a challenge device, the known series of points will be used to identify the seed value to be used. In this way the seed does not need to be entered at the challenge device as it can be generated/determined from the biometric data or signature. In some cases, this may require there to be a database accessible to the challenge device corresponding the series of points in the biometric to a list of seeds which are used for all entries.

Once the token has been generated, the secure element (116) may erase or flush all records of the biometric data and biometric signature. The secure element (116) of the device (110) may be configured to transmit the token to the secure server (120) via a secure communication channel (130). In some embodiments, the secure element (116) may transmit one or both of the seed value and auxiliary information to the secure server (120) together with the token. Depending on whether the token relates to a registration or authentication of a user's biometric data, a registration request or authentication request, as the case may be, may also be transmitted to the secure server (120) together with the token. Embodiments further anticipate the device (110) being operable to receive a token and optionally a seed value from the secure server (120) to enable the device (110) to authenticate biometric data thereat.

The auxiliary information referred to herein may include one or both of an identifier of the device (110) and an identifier of the user. In some embodiments, the auxiliary information includes an identifier of a challenge device which will be used to authenticate biometric information, time and date at which the authentication/registration request was generated, time-to-live information associated with the token, etc. The auxiliary information may also include other information relating to the user, such an account number at a financial institution or a phone number of the user, a profile number and other appropriate personal information of the user.

The secure communication channel (130) may be established over a communication network (132) between the secure element (116) and the secure server (120) prior to communicating any sensitive information between the secure element and secure server (120). The secure communication channel may be established using Pretty Good Privacy (PGP) encryption, transport layer security (TLS), secure sockets layer (SSL) or the like. Transmission of the token from the secure element of the biometric input device (110) to the secure server (120) is thus end-to-end secure. This may minimize the attack surface of the token and thus improve security of the user's biometric signature.

The secure server (120) has access to a secure database (122) in which tokens and other data (e.g. auxiliary information) may be securely stored and from which tokens and other data may be retrieved by the server (120). Tokens may be stored in the secure database (122) in association with respective user identifiers.

The server (120) is configured to receive the token from the secure element of the biometric input device (110). The token may be received together with either a registration request or an authentication request and optionally one or both of auxiliary information and the seed value.

If the token is received together with a registration request, the secure server (120) may store the received token and optionally auxiliary information and the seed value in the database (122) in association with a user profile.

Where a token is received together with an authentication request, the secure server (120) may retrieve a corresponding stored token and compare the received token (the "test" token) with the stored token so as to identify whether the tokens match. Embodiments also provide for the secure server (120) to be operable to transmit a token and optionally a corresponding seed value stored within the database (122) to a challenge device to enable that device to perform biometric authentication locally.

In other embodiments, the device (110) securely stores the token for authenticating subsequently generated tokens locally thereat and does not transmit the token to the secure server (120). A test token generated using subsequently received biometric data may then be compared to the stored token to authenticate the biometric information.

Once biometric information has been authenticated, either locally at the device (110) or remotely at the server (120), access may be granted to a user having provided the biometric information.

It should be apparent that the system described herein may have many applications. Exemplary applications include a user uniquely identifying him- or herself with an institution such as a bank to enable the user to conduct sensitive transactions, e.g., against his or her bank account. Other applications may include access control, for example access to restricted resources such as hotel rooms, offices, factories and the like. In another application, mobile communication devices such as mobile phones may incorporate a biometric input device as described herein to regulate access to sensitive information stored therein.

Figure 2:
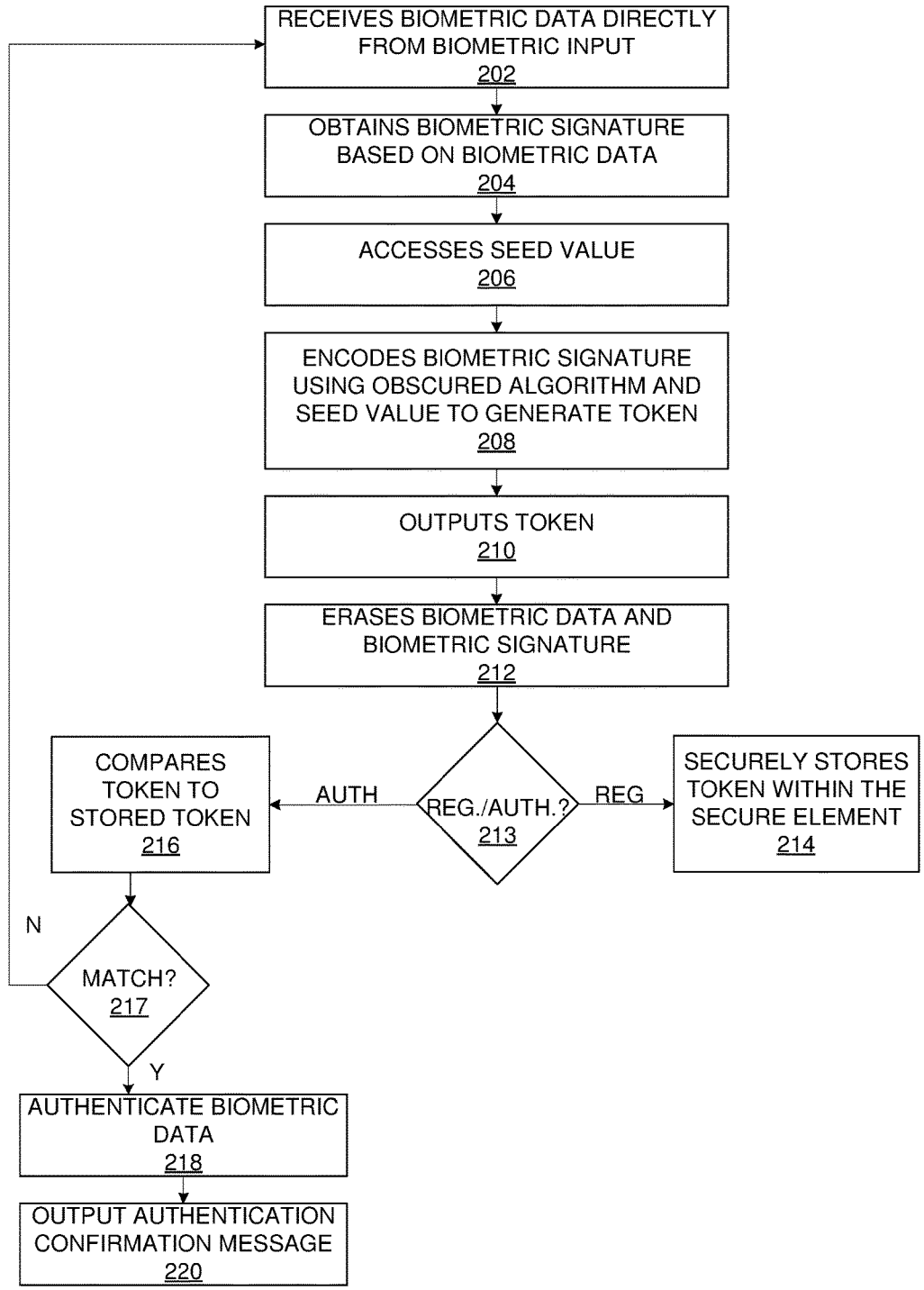
FIG. 2 is a flow diagram which illustrates one exemplary embodiment of a method for securely managing biometric data.

FIG. 2 is a flow diagram which illustrates one exemplary embodiment of a method for securely managing biometric data. The method is conducted at a secure element (116) of the biometric input device (110). As mentioned above, the secure element is directly connected to the biometric input (114) of the device (110).

The secure element (116) receives (202) biometric data directly from the biometric input (114). In the case of a fingerprint, for example, the biometric data may be an image of or a bitmap representing the fingerprint while for a voice biometric, for example, the biometric data may be a sound recording of the user's voice, possibly reciting a predetermined word or series of words.

The biometric data may be received for the purposes of registering the biometric data or for authenticating it. The secure element (116) may accordingly receive a registration or authentication request/instruction from the device (110).

The secure element (116) obtains (204) a biometric signature based on the biometric data. This may include extracting certain features from the biometric data which can be used to reliably distinguish the biometric data of the user from biometric data of another user. In the case of a fingerprint, for example, the biometric signature may be information relating to patterns and/or minutiae which can be found in the fingerprint and which can be used to uniquely identify the fingerprint. In the case of a voice biometric, the signature may be a numerical representation of the sound, pattern, and/or rhythm extracted from the sound recording.

The secure element (116) accesses (206) a seed value which is specific to the biometric data by obtaining the seed value from the biometric data or the biometric signature. In some embodiments, obtaining the seed value from the biometric data or biometric signature can be repeated reliably to obtain the same the seed value repeatedly when using the same biometric data or biometric signature.

The secure element (116) may obtain the seed by, for example, evaluating predetermined data points of the biometric data or biometric signature to generate a seed value. Evaluating predetermined data points may, for example, include applying a masking function to the biometric data or biometric signature (e.g. by evaluating specific coordinates of the image of a fingerprint to determine whether there is a ridge at that coordinate or not). Alternatively, or additionally, the secure element (116) may apply a predetermined transform to the biometric data or biometric signature to generate a seed value. In some embodiments, the predetermined data points evaluated or the predetermined transformation applied can be varied to vary the seed value.

The secure element (116) encodes (208) the biometric signature using an obscured algorithm and the seed value to generate a token. The seed value may be a variable input to the obscured algorithm which may be varied to vary the algorithm and/or the token returned by the algorithm. For example, by changing the seed value, the algorithm and/or the token generated by the algorithm may be changed.

Various forms of encoding are anticipated. For example, a hash function or an encryption algorithm may be applied to the biometric signature. The algorithm or function used to encode the biometric signature may be obscured within the secure element (116) and may be unknown to the public. Due to the tamper-resistant nature of the secure element (116), as will be described in greater detail below, public access to the algorithm may be restricted and preferably prevented.

The seed value is used to generate the token. The seed value may, for example, be used as a separate input to the obscured algorithm (e.g. as an encryption key in the case of an encryption algorithm). In some cases the seed value may be concatenated in a predetermined fashion together with the biometric signature to form a single input to the obscured algorithm. It is also anticipated that the seed value may be used to select an algorithm with which to encode the biometric signature and generate the token.

The secure element (116) outputs (210) the token for secure storage within the secure element for registration or authentication of the biometric data, as the case may be. In other embodiments, the token is output for secure transmission to a secure server for registration or authentication of the biometric data.

The secure element (116) may erase (212) the biometric data and biometric signature. This may for example be performed once the token has been output or possibly once the token has been generated. Erasing the biometric data and biometric signature may include erasing or flushing a temporary memory in which the biometric data and/or biometric signature were stored during performance of the various operations described above. In this manner, once the token has been output, the biometric signature and biometric data will not be obtainable from the secure element (116).

If (213) the biometric data is received for registration thereof, the secure element (116) securely stores (214) the token within the secure element (116) for use in authenticating biometric data locally.

If (213) the biometric data is received for authentication thereof, in which case biometric data would previously have been registered and a token would have been stored, the secure element (116) compares (216) the token (i.e. the "test" token) to the stored token. If (217) the test token substantially matches the stored token, the secure element (116) may authenticate (218) the biometric data. If (217) the test token does not match the stored token, the secure element (116) may deny authentication of the biometric data and the user may be prompted to re-present his or her biometrics.

In implementations in which the obscured algorithm produces a non-invertible token (such as a hash function) the secure element (116) may compare the test token to the stored token directly and may expect an exact match in order to authenticate (218) the biometric data.

In other scenarios, for example, where the algorithm is an encryption algorithm which is invertible, comparing (216) the tokens may include decoding the tokens and comparing the biometric signatures of the decoded tokens with each other for a threshold match (e.g. a certain predetermined similarity or a predetermined confidence) in order to authenticate (218) the biometric data. In some cases, this may be performed once the biometric signature of the test data has been obtained. Decoding the tokens may include decrypting the tokens using an appropriate key (e.g. a key obtained from the seed value or the seed value itself) to obtain the biometric signatures.

The secure element may output (220) to the device (110) an authentication confirmation or denial message indicating the authentication or denial of the biometric data. This may enable the device (110) upon receiving an authentication message from the secure element (116) to grant to the user access to the requested resource, etc.

Figure 3:
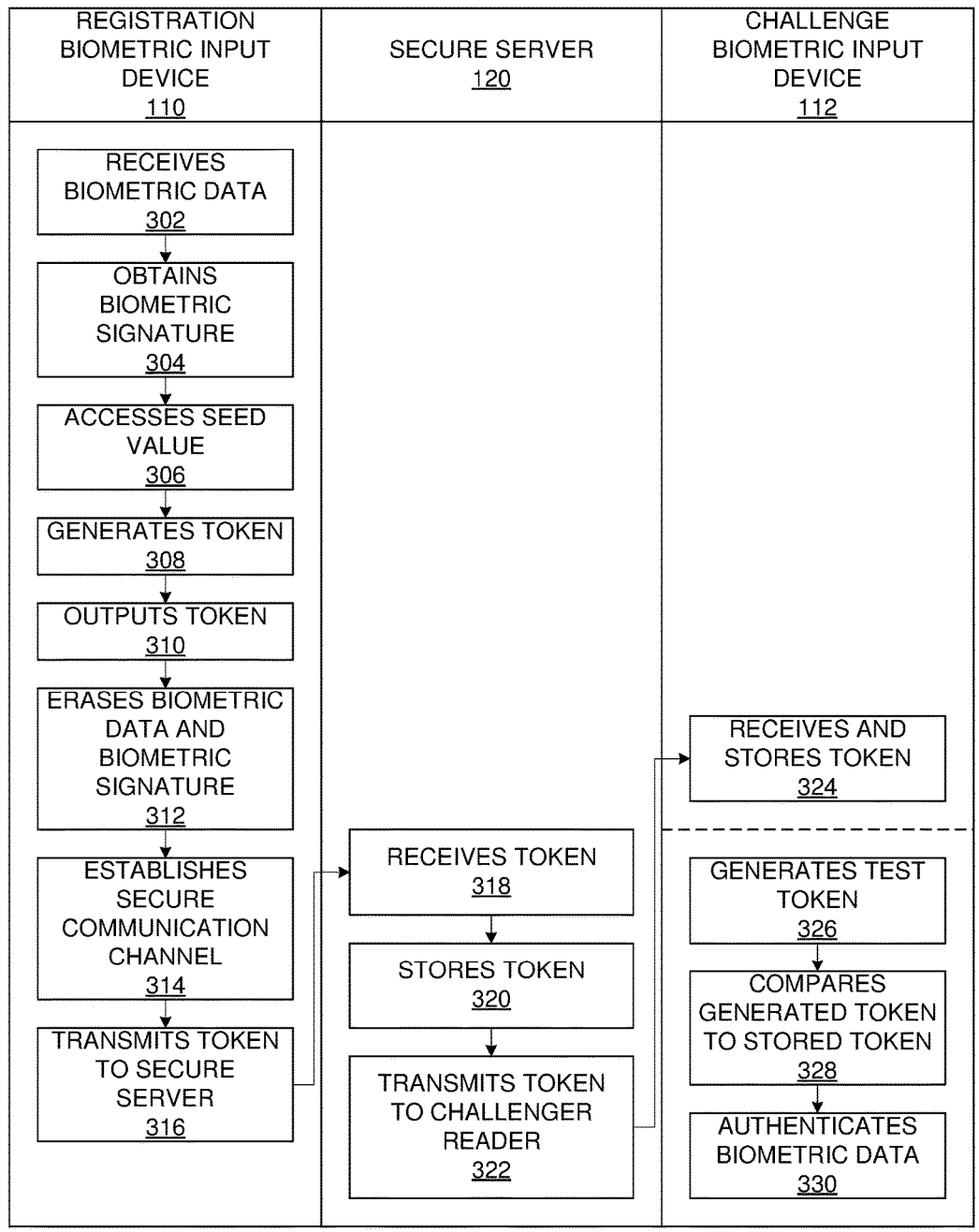
FIG. 3 is a swim-lane flow diagram which illustrates another exemplary embodiment of a method for securely managing biometric data.

FIG. 3 is a swim-lane flow diagram which illustrates another exemplary embodiment of a method for securely managing biometric data in which the token is sent to the secure server for registration or authentication thereat.

A registration process, which may be part of a hotel check-in, bank registration, etc., may be performed using a first biometric input device (110) (a registration device). Once the registration process has been completed, a user can later use his or her biometrics to gain access to his or her room or to other facilities of the hotel, to transact with his or her bank, etc. Subsequent use of the registered biometric information may be performed at challenge device (112), which may be the registration device (110) or another biometric input device. The challenge device (112) may, for example be located at a hotel room door or, for a financial scenario, an automatic teller machine, the user's mobile communication device or the like.

As with the method described above with reference to FIG. 2, the secure element (116) of the registration device (110) receives (302) biometric data directly from the biometric input (114) and obtains (304) a biometric signature based on the biometric data. The secure element (116) accesses (306) a seed value which is specific to the biometric data by obtaining the seed value from the biometric data or the biometric signature and generates (308) a token by encoding the biometric signature using an obscured algorithm and the seed value. The secure element (116) outputs (310) the token for secure transmission to a secure server for registration or authentication of the biometric data thereat. The secure element (116) erases (312) the biometric data and biometric signature. These initial operations (302-312) are similar to those operations (202-212) described above with reference to FIG. 2 and the description thereof is applicable mutatis mutandis to this embodiment.

The secure element (116) establishes (314) a secure communication channel (130) with the secure server (120). This may include obtaining a random encryption key and encrypting data to be transmitted using the random encryption key and a symmetric encryption algorithm to generate encrypted data. The data to be transmitted may include the token, a registration or authentication instruction/request and, in some embodiments, one or both of the seed value and auxiliary information. The random encryption key may be encrypted using a public key of the secure server (120).

The secure element (116) transmits (316) the token to the secure server (120) via the secure communication channel (130) for registration or authentication thereat. In this embodiment, the token is included in the encrypted data which is sent to the secure server (120) together with the encrypted key. In some embodiments, the secure communication channel may further utilize an interaction identifier which is unique to the channel between the device (110) and the secure server (120) to prevent replay attacks.

The secure server (120) receives (318) the token via the secure communication channel (130). Receiving the token via the secure communication channel may include receiving the encrypted data and an encrypted key. The server (120) may decrypt the encrypted key using a private key of the secure server (120) and may then use the decrypted key to decrypt the encrypted data. The token may be received together with a registration request/instruction as well as the seed value and/or auxiliary information. Further data and/or messages transmitted between the secure element (116) and the secure server (120) may be encrypted using the random encryption key now known to both the secure element (116) and the secure server (120).

The token, having been received together with a registration request, is stored (320) at the secure server (120). The token may be stored in the secure database (122). In some cases, the token is stored in association with a user profile which may be pre-existing or which may be created at the time of registration. The user profile may have other particulars of the user associated therewith. The token may be stored in association with the seed value and/or the auxiliary information and may be used to subsequently authenticate a token received from the secure element (116) of the device (110) or from another device.

In the illustrated embodiment, the token may be transmitted (322) to another biometric input device (112) (i.e. a challenge device). The challenge device (112) may be identified using the auxiliary information. For example, the auxiliary information may list a number of resources to which the user has access, where each resource is associated with a challenge device. The token and other data may be transmitted over a secure communication channel, which may be established in a similar manner as described in the foregoing. In other embodiments, where the token is received together with an authentication request, the received token may be compared against a stored token for authentication thereof.

In the illustrated embodiment, the challenge device (112) receives the token and optionally the seed value and auxiliary information via a secure communication channel established between the secure server (120) and the challenge device (112). The challenge device (112) securely stores (324) the token and optionally the seed value and auxiliary information and in a secure element thereof to enable the challenge device (112) to perform authentication of subsequently received biometric data locally.

The challenge device (112) may for example subsequently be used by a user wishing to authenticate his or her biometric data so as to gain access to a resource (such as a hotel room or a bank account). The challenge device (112) may generate (326) a test token based on biometric data received (together with an authentication request) from a biometric input directly connected to the secure element of the challenge device. This may include performing similar operations to the operations (302-310) performed by the registration device (110) to generate a token for registration. The challenge device (112) may then compare (328) the test token to the stored token. If the test token and the stored token match, the challenge device (112) may authenticate (330) the biometric data. This may include transmitting an authentication message to the secure server (120) and the secure element of the challenge device (112) outputting an authentication message to the device (112) to enable the device to grant the user access to the resource.

The token may have an expiry time or other condition associated with it, which once reached or met will cause the token to be deleted from the challenge device (112).

In another embodiment, only the seed value is transmitted by the secure server (120) to the challenge device (112) to enable the challenge device (112) to generate a token based on received biometric data, for example by performing the operations (302-312) described above, and to transmit the token to the secure server (120) for authentication thereat.

It is further anticipated that in other embodiments, the challenge device does not receive a registered token from the secure server but rather, upon receiving biometric data for authentication, generates a token and then transmits the generated token together with an authentication request to the secure server (e.g. by performing the token generation and transmission operations (302 to 316) described with reference to the registration device (110)) for comparison against a stored token and authentication thereat. The secure server (120) may then compare the received token with a corresponding stored token and may then transmit an authentication confirmation or denial message to the challenge device depending on whether the tokens match.

Aspects of the methods described above are now elaborated on.

Figure 4:
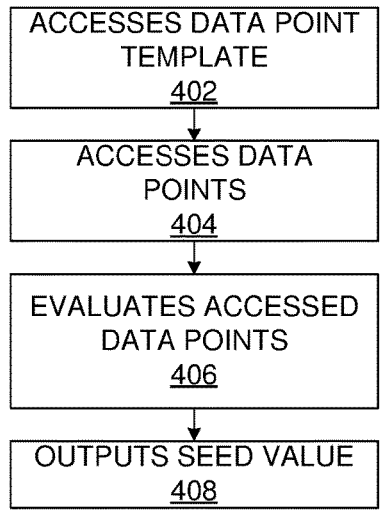
FIG. 4 is a flow diagram which illustrates operations which may be performed to access a seed value which is specific to biometric data according to a first exemplary embodiment.
Figure 5:
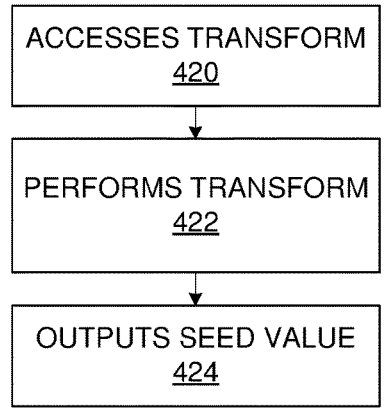
FIG. 5 is a flow diagram which illustrates operations which may be performed to access a seed value which is specific to biometric data according to a second exemplary embodiment.

FIGS. 4 and 5 are flow diagrams which illustrates exemplary embodiments of operations which may be performed to access a seed value which is specific to the biometric data.

The operations may be performed by a secure element (116) of a biometric input device and may form part of the operation (206, 306) of accessing a seed value described above with reference to FIGS. 2 and 3.

In the exemplary embodiment illustrated in FIG. 4, the secure element (116) obtains a seed value from the biometric data or biometric signature by evaluating predetermined data points of the biometric data or biometric signature to generate a seed value.

The secure element (116) accesses (402) a data point template which specifies which data points of the biometric data or biometric signature should be analysed. The template may be varied to vary the seed value obtained. The template may for example specify coordinates of an image which should be evaluated, points in time at which a sound recording should be analysed, etc. In some cases, the template is a mask which, when applied to the biometric data or biometric signature reveals a seed value. The secure element (116) accesses (404) the data points specified by the data point template and then evaluates (406) the accessed data points.

Evaluating the data points may include recording the values associated with those coordinates (e.g. in the case of a colour image of a fingerprint, retina, etc. the values may relate to a pixel colour). In other cases, evaluating the data points may determine that (e.g. in the case of a fingerprint) the designated data point corresponds to a ridge or not and assigning either a 1 or 0 accordingly.

The evaluated data points or data associated with the evaluated data points are then output (408) as a data structure which represents the seed value. This may, for example, include concatenating values associated with the evaluated data points into a string or other appropriate structure.

In the exemplary embodiment illustrated in FIG. 5, the secure element (116) applies a predetermined transform to the biometric data or biometric signature to generate a seed value. The secure element (116) accesses (420) a transform. The transform may for example be a matrix operation which is performed on the biometric data or biometric signature (e.g. any appropriate vectorisation, a row-wise summation, column-wise summation, etc.). The secure element then performs (422) the transform on the biometric data or biometric signature and outputs (424) the seed value.

Figure 6:
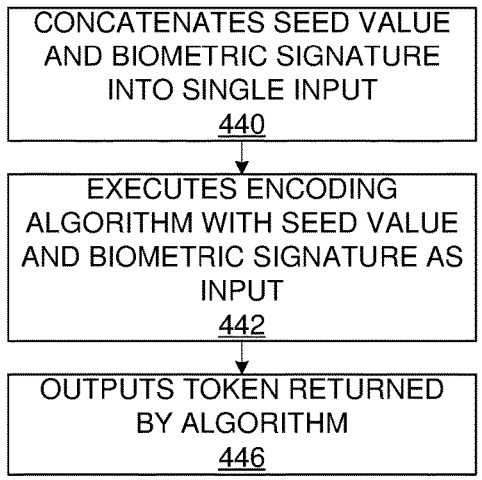
FIG. 6 is a flow diagram which illustrates operations which may be performed to encode a biometric signature in embodiments described herein.
Figure 7:
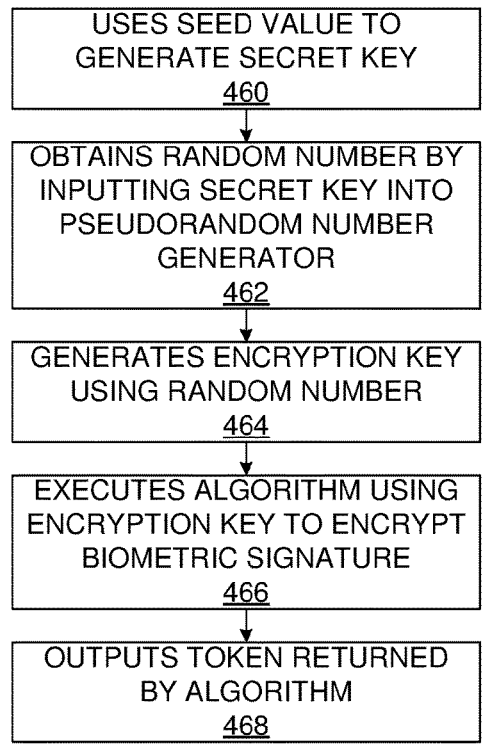
FIG. 7 is a flow diagram which illustrates further operations which may be performed to encode a biometric signature in embodiments described herein.
Figure 8:
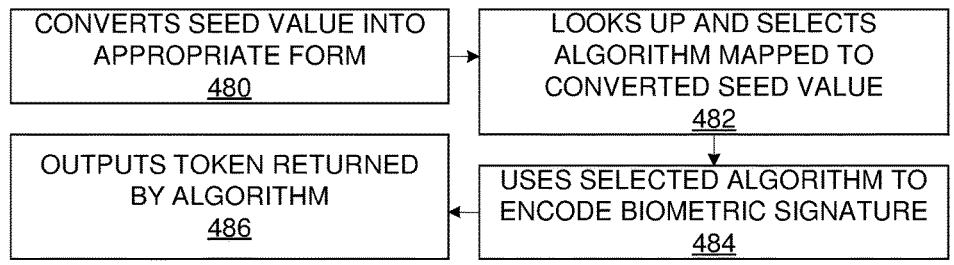
FIG. 8 is a flow diagram which illustrates operations which may be performed to encode a biometric signature in embodiments described herein.

FIGS. 6 to 8 are flow diagrams which illustrate various exemplary embodiments of operations which may be performed to encode a biometric signature using an obscured algorithm and a seed value to generate a token. The operations may be performed by a secure element (116) of a biometric input device (110) and may form part of the operations (208, 308, 326) of generating a token described above with reference to FIGS. 2 and 3.

In the embodiment illustrated in FIG. 6, the secure element concatenates (440) the seed value and biometric signature into a single input. The seed value and biometric signature may be concatenated or otherwise merged or joined together in a predetermined fashion for input into an encoding algorithm.

In some embodiments, the encoding algorithm may be an algorithm which outputs a non-invertible token based on the input. The algorithm may for example be a hash function (e.g. a cryptographic hash function) which returns a token in the form of a fixed-size alphanumeric string. For the same input, the hash function will produce the same output and hence the token can be compared to a stored token so as to authenticate the biometric data having been used to generate the token. Thus, the token, for the same biometric signature, can be changed or varied by changing or varying the seed value.

In other embodiments, the encoding algorithm is an encryption algorithm which uses an encryption key to encrypt the seed value and biometric signature and returns a token in the form of cipher text. The encryption key may be a shared encryption key known to both the secure server and the secure element or may be an asymmetric key (e.g. a public key of the secure server which is known to the secure element).

The secure element executes (442) the encoding algorithm with the seed value and biometric signature as the input and then outputs (446) the token returned by the algorithm. In embodiments in which the algorithm is a hash function, the token may be non-invertible meaning that the biometric signature cannot be obtained from the token. In embodiments in which the algorithm is an encryption algorithm, the biometric signature may be obtained from the token by decrypting the token using the appropriate key. In some embodiments, a test token and a stored token are required to be decoded before they can be compared with each other.

It should be appreciated that any appropriate algorithm may be used. In some embodiments, the algorithm is proprietary and not publically known. By obscuring the algorithm within the tamper-resistant secure element an additional layer of security may be obtained as unscrupulous third parties may not know the algorithm that was used to encode the token.

In the embodiment illustrated in FIG. 7, the seed value is used as a separate input to the obscured algorithm. The algorithm may for example be an encryption algorithm and the seed value may be used as an encryption key.

In order to obtain a suitable key, secure element (116) may use the seed value to generate (460) a secret key using an appropriate key derivation function. Using a key derivation function may ensure that derived keys have desirable properties, e.g. by avoiding weak keys. In some cases, the key derivation function may be made deliberately slow so as to frustrate brute-force attacks.

The secure element (116) may obtain (462) a random number by inputting the secret key into a pseudorandom number generator. In this exemplary embodiment, the secure element (116) may then use the random number output by the pseudorandom number generator to generate (464) an encryption key (or key pair). The generated encryption key can then be provided as a separate input into the obscured algorithm. The algorithm is executed (466) using the encryption key to encrypt the biometric signature and return a token which is then output (468) by the secure element (116). In other embodiments, the secret key output by the key derivation function may be used as the input to the encryption algorithm.

In the embodiment illustrated in FIG. 8, the seed value is used to select an algorithm with which to encode the biometric signature and generate the token. The secure element (116) may for example be configured to execute a number of obscured algorithms and may have a mapping of seed values to algorithms stored therein.

The secure element (116) may initially convert (480) the seed value into an appropriate form (e.g. into a numeric value) and may then look up (482) and select an algorithm mapped to the converted seed value. The mapping may, for example, assign seed values within a certain range to a corresponding algorithm such that a converted seed value falling within a particular range is mapped to a particular algorithm. The secure element (116) then uses the selected algorithm to encode (484) the biometric signature and outputs (486) the token returned by the algorithm.

Figure 9:
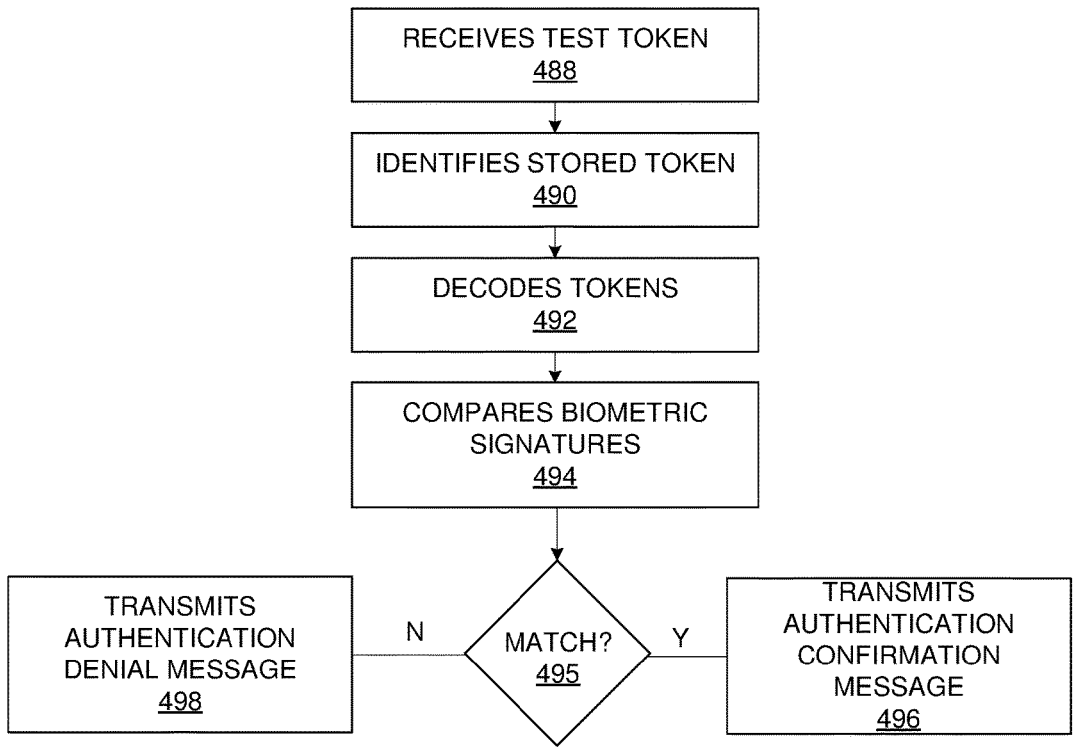
FIG. 9 is a flow diagram which illustrates an exemplary embodiment of a method for securely managing biometric data which may be carried out by a secure server.

FIG. 9 is a flow diagram which illustrates an exemplary embodiment of a method for securely managing biometric data which may be carried out by the secure server (120).

The secure server (120) receives (488) a test token and seed value together with an authentication request and auxiliary information from a challenge device (112). The test token may have been generated at the challenge device (112) responsive to a user presenting his or her biometrics for authentication (e.g. to access a resource). The test token may have been generated by encoding a biometric signature obtained from biometric data using an algorithm obscured within the challenge device (112) and a seed value. The seed value may have been obtained from biometric data or a biometric signature in a manner which can be repeated reliably to obtain the same seed value.

The secure server (120) identifies (490) a stored token and a stored seed value associated with the received auxiliary information. The auxiliary information may, for example, include a user identifier to enable the server (120) to identify a corresponding user profile stored in the secure database (122) and which has a seed value which was obtained during registration of the token associated therewith. The stored seed value may have been obtained from biometric data or a biometric signature obtained during registration. As the same biometric is concerned (e.g. the same fingerprint or voice record), the received seed value and the stored seed value are the same.

The secure server (120) then compares the test token with the stored token. In this embodiment, comparing the tokens includes decoding (492) the test token and the stored token using the stored seed value and an obscured algorithm. The seed value may, for example, be used to determine an appropriate decoding algorithm or may be used as or to obtain an encryption/decryption key as described above with reference to FIGS. 6 to 8.

Decoding the tokens returns the biometric signature which was encoded in each token. The secure server (120) compares (494) the biometric signature of the test token with the biometric signature of the stored token. In another embodiment, comparing the tokens may compare the tokens for an exact match.

If (495) the biometric signatures match (e.g. if there is an above threshold similarity or confidence), the secure server (120) may transmit (496) an authentication confirmation message to the challenge device (112). If (495) the biometric signatures do not match, the secure server (120) may transmit (498) an authentication denial message to the challenge device (112).

Figure 10:
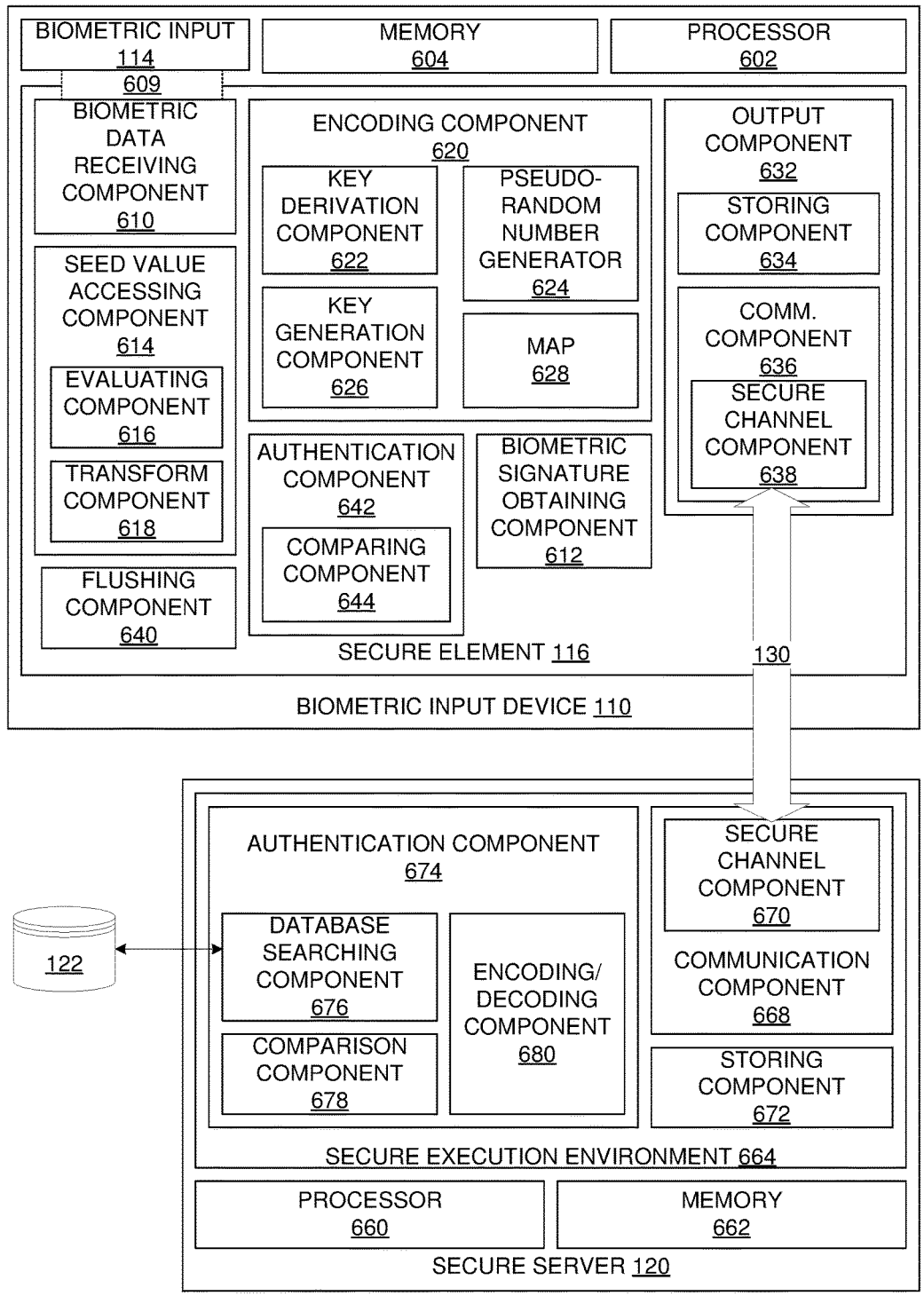
FIG. 10 is a block diagram which illustrates components of an exemplary biometric input device and secure server described herein.

Referring now to the block diagram in FIG. 10, components of the exemplary biometric input device (110) and secure server (120) described above are illustrated.

The biometric input device (110) may be a registration device or a challenge device. In some embodiments, the same biometric device may be configured to be a registration device and a challenge device while in other embodiments the device may only have the functionality or either a registration device or a challenge device.

The biometric input device (110) may include a processor (602) for executing the functions of components described below, which may be provided by hardware or by software units executing on the biometric input device (110). The software units may be stored in a memory component (604) and instructions may be provided to the processing circuit (602) to carry out the functionality of the described components.

The biometric input device (110) includes a biometric input (114) for obtaining biometric data from a user and a secure element (116) which is connected directly to the biometric input (114).

The biometric input (114) is any suitable input which is operable to obtain, such as one or more of the group of: fingerprint, thumb print or palm records; iris or retina records; DNA records; voice records; gait records, and the like. The biometric input (114) may be one or more of the group of: a fingerprint scanner for obtaining a fingerprint or a thumbprint; a microphone for recording a user's voice; a camera or high-resolution camera for photographing a face, palm retina, iris, etc. of a user or for recording a user's movement so as to determine gait information; a retina scanner for scanning a user's retina; an accelerometer for recording information relating to a user's gait; and the like.

The biometric input (114) is arranged to obtain biometric information from a user (102) and to output biometric data which relates to the biometric information. The biometric data may be output in any appropriate data structure. One or more data lines (609) directly connect the output of the biometric input (114) to the secure element (116).

The secure element (116) is a tamper-resistant platform (e.g. a secure microcontroller) which is capable of securely hosting applications and their confidential and cryptographic data (e.g. key management) in accordance with certain rules and security requirements, such as FIPS 140-2 level 2 or above.

The secure element (116) has an algorithm for generating a token, which uses a seed value and a biometric signature as inputs, stored therein. The algorithm may be obscured within the secure element (116) such that it is not accessible from outside the secure element.

The secure element (116) uses hardware to encode data instead of solely performing the encoding in software and accordingly provides enhanced protection over software encoding technologies. For example, the secure element (116) provides secure key management to generate cryptographic keys, sets the capabilities and security limits of keys, implements key backup and recovery, prepares keys for storage, generates tokens, performs encryption, and performs key revocation and destruction.

In some embodiments, the secure element (116) is implemented as a dual processor device that includes a secure processor with storage and a public processor with storage. The token-generating algorithm, a private key of the secure server (120) and one or more seed values may be stored in the secure storage of the secure processor.

The secure element (116) may also include a physical or logical separation between interfaces that are used to communicate critical security parameters and other interfaces that are used to communicate other data. The secure element (116) can also provide a tamper-proof mechanism that provides a high risk of destroying the secure element (116) and the cryptographic keys, seed values and token-generating algorithms stored therein, if any attempt is made to remove or externally access the secure element (116).

The secure element (116) may include a biometric data receiving component (610) configured to receive biometric data directly from the biometric input (114). In some embodiments, the biometric input and secure element are physically located proximate each other to minimise any possibility of intercepting biometric data being transmitted from the biometric input (114) to the secure element (116).

The secure element (116) includes a biometric signature obtaining component (612) which is arranged to obtain a biometric signature based on the biometric data. The biometric signature obtaining component (612) may, for example, extract certain features from the biometric data which can be used to reliably distinguish the biometric data of the user from biometric data of another user.

The secure element (116) may also include a seed value accessing component (614) which is arranged to access a seed value specific to the biometric data. The seed value accessing component (614) accesses the seed value by obtaining the seed value from the biometric data or the biometric signature. In some embodiments, obtaining the seed value from the biometric data or biometric signature can be repeated reliably to obtain the same the seed value repeatedly when using the same biometric data or biometric signature.

The seed value accessing component (614) may include an evaluating component (616) which his configured to evaluate predetermined data points of the biometric data or biometric signature to generate a seed value. Evaluating predetermined data points may, for example, include applying a masking function to the biometric data or biometric signature (e.g. by evaluating specific coordinates of the image of a fingerprint to determine whether there is a ridge at that coordinate or not). The seed value accessing component (614) may include a transform component (618) which is arranged to transform to the biometric data or biometric signature to generate a seed value. The predetermined data points evaluated or the predetermined transformation applied can be varied to vary the seed value.

Some embodiments anticipate challenge devices being operable to receive a seed value together with a token for use in authenticating biometric data and for accessing a seed value to include accessing a seed value stored in a memory of the secure element.

The secure element (116) may further include an encoding component (620) which is arranged to encode the biometric signature using the obscured algorithm and the seed value to generate a token.

The encoding algorithm may be an algorithm which outputs a non-invertible token based on the input. The algorithm may for example be a hash function (e.g. a cryptographic hash function) which returns a token in the form of a fixed-size alphanumeric string. For the same input, the hash function will produce the same output and hence the token can be compared to a stored token so as to authenticate the biometric data having been used to generate the token. Thus, the token, for the same biometric signature, can be changed or varied by changing or varying the seed value.

Alternatively, the encoding algorithm may be an encryption algorithm which uses an encryption key to encrypt the seed value and biometric signature and returns a token in the form of cipher text. The encryption key may be a shared encryption key known to both the secure server and the secure element or may be an asymmetric key (e.g. a public key of the secure server which is known to the secure element).

In some embodiments, the encoding component (620) is arranged to concatenate the seed value and biometric signature into a single input. The seed value and biometric signature may be concatenated or otherwise merged or joined together in a predetermined fashion for input into an encoding algorithm.

Embodiments further anticipate that the encoding component (620) may include a key derivation component (622) which is arranged to generate a secret key from the seed value using an appropriate key derivation function. The encoding component (620) may also include a pseudorandom number generator (624) which may be cryptographically secure and is arranged to generate a random number using the secret key as a seed. The encoding component (620) may further include a key generation component (626) which is arranged to generate an encryption key (or key pair). The generated encryption key can then be provided as a separate input into the obscured algorithm. The encoding component (620) executes the algorithm, in this case being an encryption algorithm, using the encryption key to encrypt the biometric signature and return a token which is then then output by the encoding component (620). In other embodiments, the secret key output by the key derivation function may be used as the input to the encryption algorithm.

In some embodiments, a number of different encoding algorithms may be stored within the secure element (116) and the encoding component (620) may include a map (628) which maps seed values within a certain range to a corresponding algorithm, such that a seed value falling within a particular range is mapped to a particular algorithm. The encoding component (620) may then use the selected algorithm to encode the biometric signature and outputs the token returned by the algorithm. This may require the encoding component (620) to convert the seed value into an appropriate form (e.g. into a numeric value) before looking up and selecting an algorithm.

In implementations in which the algorithm produces an invertible token (e.g. in the case of an encryption algorithm) the encoding component (620) may be operable to decode tokens to obtain a biometric signature therefrom. Decoding the tokens may include decrypting the tokens using an appropriate key (e.g. a key obtained from the seed value or the seed value itself) to obtain the biometric signatures.

The secure element (116) includes an output component (632) which is configured to output the token for secure storage or transmission to the secure server (120). The output component (632) may include a storing component (634) which is configured to securely store the token within the secure element (116) for registration or authentication of the biometric data. Storing the token for authentication may temporarily store the token while storing the token for registration may store the token for the duration of the registration. The token may accordingly be stored in association with a time-to-live condition or the like.

The output component (632) may include a communication component (636) arranged to transmit and receive messages and data to and from the secure server (120). The communication component (636) may communicate with the secure server using any appropriate wired or wireless communication network. The communication component (636) may further include a secure channel component (638) configured to establish a secure communication channel (130) with the secure server (120). In some embodiments, the secure channel component (638) uses PGP encryption.

The communication component (636) may be configured to transmit a message based on the token which, for registration devices, may include transmitting the token to the secure server via the secure communication channel for storage thereat. The token may be transmitted with one or both of the seed value and auxiliary information. In one embodiment, for challenge devices, the message based on the token transmitted by the communication component (636) may include transmitting the token to the secure server (120) for authentication thereat. The communication component (636) may further be configured to receive, from the secure server (120), an authentication confirmation or denial message.

The secure element (116) may include a flushing component (640) which is arranged to flush or erase (212) the biometric data and biometric signature from the secure element (116). This may for example be performed once the token has been output or possibly once the token has been generated.

The secure element (116) may further include an authentication component (642) which is configured to authenticate biometric data locally.

The authentication component (642) may include a comparison component (644) which is arranged to compare a test token to the stored token. In implementations in which the obscured algorithm produces a non-invertible token (such as a hash function) the comparison component (644) may compare the test token to the stored token directly and may expect an exact match in order to authenticate the biometric data. In other scenarios, for example, where the algorithm is an encryption algorithm which is invertible, the comparison component (644) may decode the test token and the stored token and may then compare the biometric signatures obtained from the decoded tokens with each other for a threshold match (e.g. a certain predetermined similarity or a predetermined confidence) in order to authenticate the biometric data.

If the test token substantially matches the stored token, the authentication component (642) may authenticate the biometric data and may output to the device (110) an authentication confirmation or denial message indicating the authentication or denial of the biometric data. The device (110) may be configured to act on this message to grant or deny access to the requested resource.

In other embodiments, the authentication component (642) may be configured to receive a token from the secure server (120) and to securely store it for the purposes of authenticating subsequently received biometric data. Receiving the token may include receiving one or both of a seed value and auxiliary information. The authentication component (642) may further be configured to use the comparison component (644) to compare the test token to the stored token and, if the generated token substantially matches the stored token, to authenticate the biometric data. The test token may be generated using a seed value having been accessed from one of: a memory of the secure element or the biometric data itself. The authentication component (642) may transmit an authentication confirmation message to one or both of the secure server (120), using the communication component (636), and the device (110) itself.

The secure server (120) may be any appropriate server computer or distributed server computer. The secure server (120) may include one or more processors (660) for executing the functions of components described below, which may be provided by hardware or by software units executing on the secure server (120). The software units may be stored in a memory component (662) and instructions may be provided to the processing circuit (660) to carry out the functionality of the described components.

The secure server (120) may include a secure execution environment (664). The secure execution environment (664) may be provided by a hardware security module and may have an algorithm for generating tokens, which use a seed value and a biometric signature as inputs, stored therein. The algorithms used herein may be proprietary and may be known only to secure devices of the system, for example the registration devices, challenge devices and the secure server (120).

The secure execution environment (664) may include a communication component (668). The communication component (668) may include a secure channel component (670) for establishing a secure communication channel (130) with the secure element (116) of the biometric input device (110).

The communication component (668) is operable to receive, via the secure communication channel (130), a token from the secure element (116). The token may be received together with an authentication request or a registration request. The token may further be received together with one or both of a seed value and auxiliary information.

The secure server (120) has access to a secure database (122) and includes a storing component (672) which is operable, if the token is received together with the registration request, to store the received token in the database (122). This may include storing the token in association with a user profile associated with the token and optionally one or both of the seed value and auxiliary information.

The secure server (120) may further be provided with an authentication component (674) for, if the token is received together with an authentication request, authenticating the received token. The authentication component (674) may have a database searching component (676) for identifying a stored token and optionally a stored seed value associated with the received token.

The authentication component (674) may include a comparison component (678) which is arranged to compare the stored token against the test token (i.e. the token to authenticated) and, if the stored token substantially matches the test token, transmitting an authentication confirmation to the secure element via the communication component (668).

In some cases, the comparison component (678) may include an encoding/decoding component (680) which is configured to decode the received token using the obscured algorithm and the seed value to obtain a biometric signature. The encoding/decoding component (680) may be configured to provide similar functionality to the encoding component (620) of the secure element (116). The comparison component (678) may compare the decoded biometric signatures for a threshold match. The encoding/decoding component (680) may further be operable to re-encrypt the biometric signature using the obscured algorithm and the stored seed value to generate a test token. In other cases, the comparison component (678) compares the tokens without decoding them (e.g. for an exact match).

In some embodiments, the authentication component (674) may be configured to obtain a token and transmit the token via the communication component (668) to a secure element of a biometric input device for storage therein and for subsequent use in authenticating biometric data locally thereat. The authentication component (674) may for example use the database searching component (676) to retrieve a stored token from the database (122) and transmit the retrieved token to the secure element.

This process of tokenization (i.e., secure seeded biometric) may ensure that biometric information of a user does not get compromised, by allowing a token to be generated and used where required. The seed value allows a user's biometric information to 'change', i.e., the token (of the same biometric) in one system will not be the same as in another. This may mitigate effectiveness of replay attacks.

Figure 11:
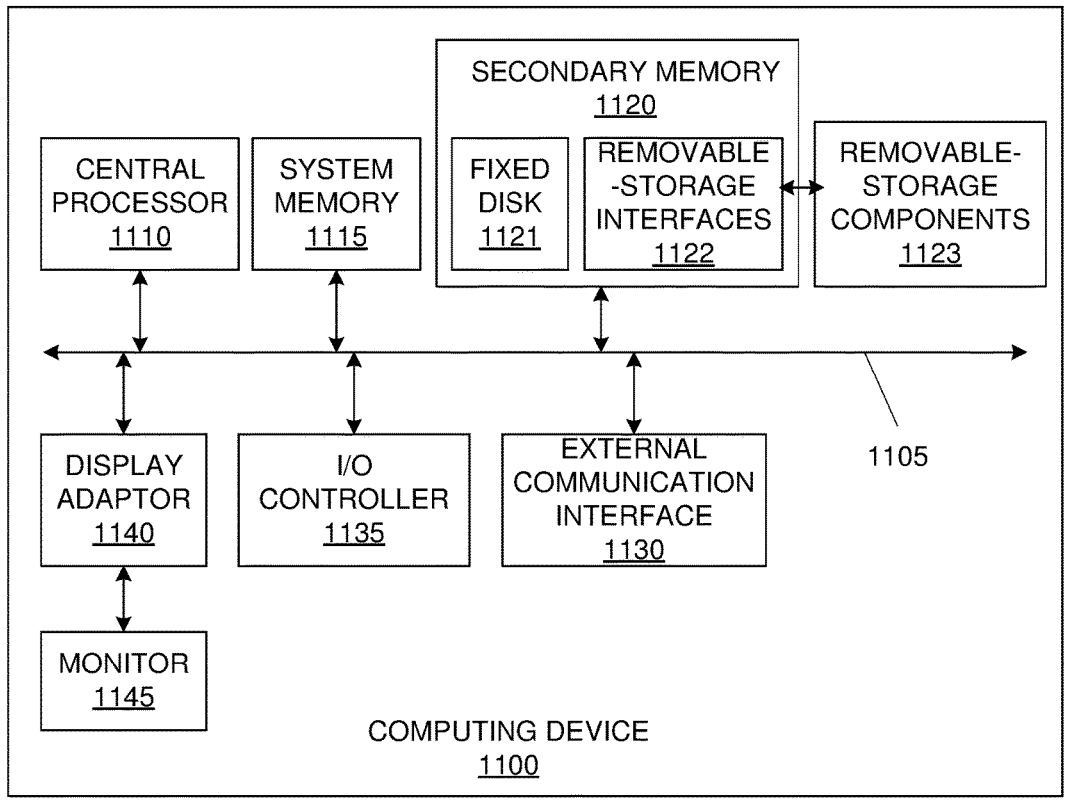
FIG. 11 illustrates an example of a computing device in which various aspects of the disclosure may be implemented; and,
FIG. 12 shows a block diagram of a communication device that may be used in embodiments of the disclosure.

FIG. 11 illustrates an example of a computing device (1100) in which various aspects of the disclosure may be implemented. The computing device (1100) may be suitable for storing and executing computer program code. The various participants and elements in the previously described system diagrams, for example the secure server (120), may use any suitable number of subsystems or components of the computing device (1100) to facilitate the functions described herein. The computing device (1100) may include subsystems or components interconnected via a communication infrastructure (1105) (for example, a communications bus, a cross-over bar device, or a network). The computing device (1100) may include one or more central processors (1110) and at least one memory component in the form of computer-readable media. In some configurations, a number of processors may be provided and may be arranged to carry out calculations simultaneously. In some implementations, a number of computing devices (1100) may be provided in a distributed, cluster or cloud-based computing configuration and may provide software units arranged to manage and/or process data on behalf of remote devices.

The memory components may include system memory (1115), which may include read only memory (ROM) and random access memory (RAM). A basic input/output system (BIOS) may be stored in ROM. System software may be stored in the system memory (1115) including operating system software. The memory components may also include secondary memory (1120). The secondary memory (1120) may include a fixed disk (1121), such as a hard disk drive, and, optionally, one or more removable-storage interfaces (1122) for removable-storage components (1123). The removable-storage interfaces (1122) may be in the form of removable-storage drives (for example, magnetic tape drives, optical disk drives, etc.) for corresponding removable storage-components (for example, a magnetic tape, an optical disk, etc.), which may be written to and read by the removable-storage drive. The removable-storage interfaces (1122) may also be in the form of ports or sockets for interfacing with other forms of removable-storage components (1123) such as a flash memory drive, external hard drive, or removable memory chip, etc.

The computing device (1100) may include an external communications interface (1130) for operation of the computing device (1100) in a networked environment enabling transfer of data between multiple computing devices (1100). Data transferred via the external communications interface (1130) may be in the form of signals, which may be electronic, electromagnetic, optical, radio, or other types of signal. The external communications interface (1130) may enable communication of data between the computing device (1100) and other computing devices including servers and external storage facilities. Web services may be accessible by the computing device (1100) via the communications interface (1130). The external communications interface (1130) may also enable other forms of communication to and from the computing device (1100) including, voice communication, near field communication, radio frequency communications, such as Bluetooth™, etc.

The computer-readable media in the form of the various memory components may provide storage of computer-executable instructions, data structures, program modules, software units and other data. A computer program product may be provided by a computer-readable medium having stored computer-readable program code executable by the central processor (1110). A computer program product may be provided by a non-transient computer-readable medium, or may be provided via a signal or other transient means via the communications interface (1130).

Interconnection via the communication infrastructure (1105) allows the central processor (1110) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, and the like) may couple to the computing device (1100) either directly or via an I/O controller (1135). These components may be connected to the computing device (1100) by any number of means known in the art, such as a serial port. One or more monitors (1145) may be coupled via a display or video adapter (1140) to the computing device (1100).

Figure 12:
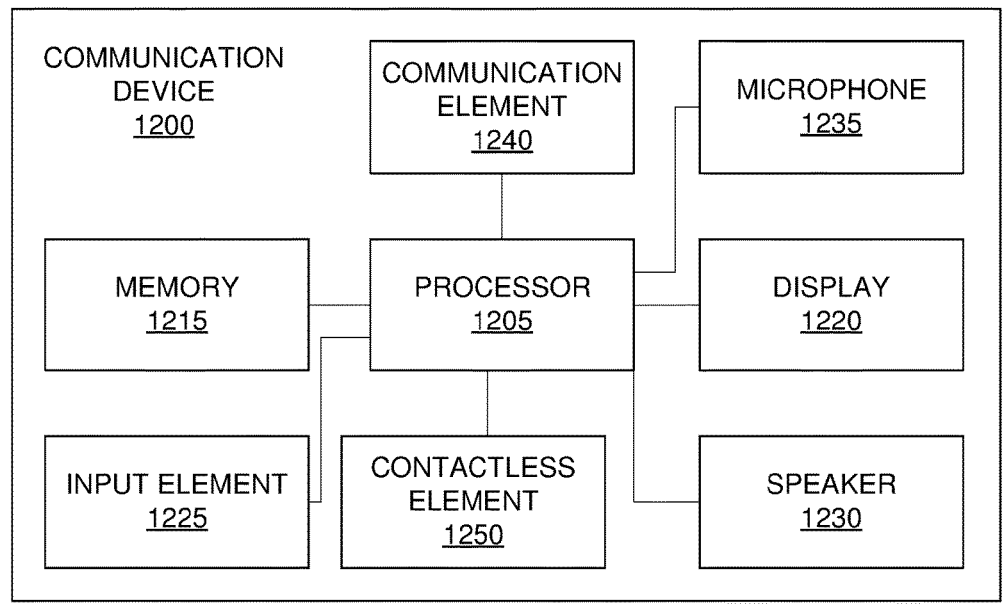

FIG. 12 shows a block diagram of a communication device (1200). The various participants and elements in the previously described system diagrams, for example the biometric input device (110), may use any suitable number of subsystems or components of the communication device (1200). The communication device (1200) may be a cell phone, a feature phone, a smart phone, a satellite phone, or a computing device having a phone capability.

The communication device (1200) may include a processor (1205) (e.g., a microprocessor) for processing the functions of the communication device (1200) and a display (1220) to allow a user to see the phone numbers and other information and messages. The communication device (1200) may further include an input element (1225) to allow a user to input information into the device (e.g., input buttons, touch screen, etc.), a speaker (1230) to allow the user to hear voice communication, music, etc., and a microphone (1235) to allow the user to transmit his or her voice through the communication device (1200). The processor (1205) of the communication device (1200) may connect to a memory (1215). The memory (1215) may be in the form of a computer-readable medium that stores data and, optionally, computer-executable instructions.

The communication device (1200) may also include a communication element (1240) for connection to communication channels (e.g., a cellular telephone network, data transmission network, Wi-Fi™ network, satellite-phone network, Internet network, Satellite Internet Network, etc.). The communication element (1240) may include an associated wireless transfer element, such as an antenna. The communication element (1240) may include a subscriber identity module (SIM) in the form of an integrated circuit that stores an international mobile subscriber identity and the related key used to identify and authenticate a subscriber using the communication device (1200). One or more subscriber identity modules may be removable from the communication device (1200) or embedded in the communication device (1200).

The communication device (1200) may further include a contactless element (1250), which is typically implemented in the form of a semiconductor chip (or other data storage element) with an associated wireless transfer element, such as an antenna. The contactless element (1250) may be associated with (e.g., embedded within) the communication device (1200) and data or control instructions transmitted via a cellular network may be applied to the contactless element (1250) by means of a contactless element interface (not shown). The contactless element interface may function to permit the exchange of data and/or control instructions between mobile device circuitry (and hence the cellular network) and the contactless element (1250). The contactless element (1250) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth™, infra-red, or other data transfer capability that can be used to exchange data between the communication device (1200) and an interrogation device. Thus, the communication device (1200) may be capable of communicating and transferring data and/or control instructions via both a cellular network and near field communications capability.

The data stored in the memory (1215) may include: operation data relating to the operation of the communication device (1200), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (1200) to selected receivers. The communication device (1200) may be, amongst other things, a notification device that can receive alert messages and access reports, a portable merchant device that can be used to transmit control data identifying a discount to be applied, as well as a portable consumer device that can be used to make payments.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™' C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method for securely managing biometric data, the method being conducted at a secure element which is directly connected to a biometric input and comprising:
   receiving biometric data directly from the biometric input;
   obtaining a biometric signature based on the biometric data;
   accessing a seed value specific to the biometric data by obtaining the seed value from the biometric data or biometric signature;
   generating a secret key based on the seed value and a key derivation function;
   obtaining a random number by inputting the secret key into a pseudorandom number generator;
   generating an encryption key based on the random number;
   encoding the biometric signature using an obscured algorithm and the encryption key to generate a token;
   outputting the token for secure storage within the secure element or secure transmission to a secure server for registration or authentication of the biometric data and erasing the biometric data and the biometric signature once the token has been output.

2. The method as claimed in claim 1 wherein obtaining the seed value from the biometric data or biometric signature can be repeated reliably to obtain the same the seed value.

3. The method as claimed in claim 1 wherein obtaining the seed value includes one of: evaluating predetermined data points of the biometric data or biometric signature to generate the seed value; or applying a predetermined transform to the biometric data or biometric signature to generate the seed value.

4. The method as claimed in claim 3 wherein evaluating predetermined data points includes applying a masking function to the biometric data or biometric signature.

5. The method as claimed in claim 3 wherein the predetermined data points evaluated or the predetermined transform applied can be varied to vary the seed value.

6. The method as claimed in claim 1 wherein the seed value is a variable input to the obscured algorithm which may be varied to vary the obscured algorithm.

7. The method as claimed in claim 1 wherein encoding the biometric signature using the obscured algorithm and the seed value includes one of a group of: using the seed value as a separate input to the obscured algorithm; concatenating the seed value together with the biometric signature as a single input to the obscured algorithm; or, selecting the obscured algorithm based on the seed value and encoding the biometric signature using the selected algorithm.

8. The method as claimed in claim 1 wherein the obscured algorithm is an encryption algorithm and wherein the seed value is used as the encryption key.

9. The method as claimed in claim 1 including transmitting the token to the secure server via a secure communication channel for registration or authentication thereat.

10. The method as claimed in claim 9 wherein the step of transmitting the token to the secure server includes transmitting one or both of the seed value and auxiliary information together with the token.

11. The method as claimed in claim 9 wherein the method includes a step of receiving, from the secure server, an authentication confirmation or denial message.

12. The method as claimed in claim 1 wherein the method includes: receiving, from the secure server, a token for use in authenticating a user; comparing the output token to the received token; and, if the output token substantially matches the received token, authenticating the biometric data.

13. The method as claimed in claim 1 including securely storing the token within the secure element for use in authenticating biometric data locally; comparing a subsequently output token to the stored token; and, if the subsequently output token substantially matches the stored token, authenticating the biometric data.

14. A method for securely managing biometric data, the method conducted at a secure server and comprising:
   receiving a token from a secure element directly connected to a biometric input, wherein the token is generated at the secure element by obtaining biometric data and encoding a biometric signature using an obscured algorithm and an encryption key, wherein a seed value is obtained from the biometric data or biometric signature, wherein a secret key is generated based on the seed value and a key derivation function, wherein a random number is obtained by inputting the secret key into a pseudorandom number generator, wherein the encryption key is generated based on the random number, wherein the biometric data and the biometric signature are erased once the token has been generated; and,
   if the token is received together with a registration request, storing the received token in a database; or,
   if the token is received together with an authentication request, authenticating the received token.

15. The method as claimed in claim 14, wherein the token is received together with auxiliary information and the seed value, and wherein authenticating the received token includes:
   identifying a stored token and stored seed value associated with the received auxiliary information;
   decoding the received token and the stored token using the obscured algorithm and the received seed value to obtain biometric signatures;
   comparing the obtained biometric signatures; and,
   if the biometric signatures substantially match, transmitting an authentication confirmation to the secure element.

16. The method as claimed in claim 14, wherein the token is received together with auxiliary information, and wherein authenticating the received token includes:
   identifying a stored token associated with the received auxiliary information;
   comparing the stored token with the received token; and, if the stored token substantially matches the received token, transmitting an authentication confirmation to the secure element.

17. The method as claimed in claim 14, wherein the method includes steps of retrieving a stored token from the database and transmitting the retrieved token to a secure element for use in authenticating a user thereat.

18. A system for securely managing biometric data, the system including a secure element, which is directly connected to a biometric input, the secure element comprising one or more processors and one or more non-transitory computer-readable media storing instructions which, when executed by the one or more processors, cause:
   receiving biometric data directly from the biometric input;
   obtaining a biometric signature based on the biometric data;
   accessing a seed value specific to the biometric data by obtaining the seed value from the biometric data or biometric signature;
   generating a secret key based on the seed value and a key derivation function;
   obtaining a random number by inputting the secret key into a pseudorandom number generator;
   generating an encryption key based on the random number;
   encoding the biometric signature using an obscured algorithm and the encryption key to generate a token;
   outputting the token for secure storage within the secure element or secure transmission to a secure server for registration or authentication of the biometric data; and
   flushing the biometric data and the biometric signature once the token has been output.

19. A system for securely managing biometric data, the system including a secure server comprising one or more processors and one or more non-transitory computer-readable media storing instructions which, when executed by the one or more processors, cause:
   receiving a token from a secure element directly connected to a biometric input, wherein the token is generated at the secure element by obtaining biometric data and encoding a biometric signature using an obscured algorithm and an encryption key, wherein a seed value is obtained from the biometric data or biometric signature, wherein a secret key is generated based on the seed value and a key derivation function, wherein a random number is obtained by inputting the secret key into a pseudorandom number generator, wherein the encryption key is generated based on the random number, wherein the biometric data and the biometric signature are erased once the token has been generated; and,
   if the token is received together with a registration request, storing the received token in a database; or,
   if the token is received together with an authentication request, authenticating the received token.

* * * * *